(12) United States Patent
Sarmast

(10) Patent No.: US 10,834,948 B2
(45) Date of Patent: Nov. 17, 2020

(54) COMPOSITION AND METHOD FOR PEELING HARD BOILED EGGS

(71) Applicant: Amy Jean Sarmast, Fayetteville, NY (US)

(72) Inventor: Amy Jean Sarmast, Fayetteville, NY (US)

( * ) Notice: Subject to any disclaimer, the term of this patent is extended or adjusted under 35 U.S.C. 154(b) by 0 days.

(21) Appl. No.: 16/226,819

(22) Filed: Dec. 20, 2018

(65) Prior Publication Data
US 2019/0380366 A1    Dec. 19, 2019

Related U.S. Application Data

(60) Provisional application No. 62/686,449, filed on Jun. 18, 2018.

(51) Int. Cl.
*A23L 15/00* (2016.01)

(52) U.S. Cl.
CPC .......... *A23L 15/00* (2016.08); *A23V 2002/00* (2013.01); *A23V 2300/24* (2013.01)

(58) Field of Classification Search
CPC .. A23L 15/00; A23V 2002/00; A23V 2300/24
See application file for complete search history.

(56) References Cited

FOREIGN PATENT DOCUMENTS

| CN | 106418318 | * | 2/2017 |
|---|---|---|---|
| CN | 106616598 | * | 5/2017 |

OTHER PUBLICATIONS

Derwent Abstract for ES 2064292 published Jan. 16, 1995.*
Derwent Abstract for CN 101822408 published Sep. 8, 2010.*
English Translation for CN106418318 published Feb. 2017.*
English Translation for CN106616598 published May 2017.*
Science on the Shelves. No date provided. https://www.york.ac.uk/res/sots/downloads/eggsperiments.pdf.*

* cited by examiner

*Primary Examiner* — Anthony J Weier
(74) *Attorney, Agent, or Firm* — Bond Schoeneck & King, PLLC; George McGuire

(57) ABSTRACT

A composition and method for easily removing the shell from a boiled egg. The composition is an amount of citric acid, an amount of ascorbic acid, and an amount of sodium chloride are in a ratio of 1.2:0.1:0.05, respectively. The composition is added to the water used to boil the eggs. After boiling, the eggs may be cooled and the shell removed more easily than normal without the need for special equipment.

14 Claims, 1 Drawing Sheet

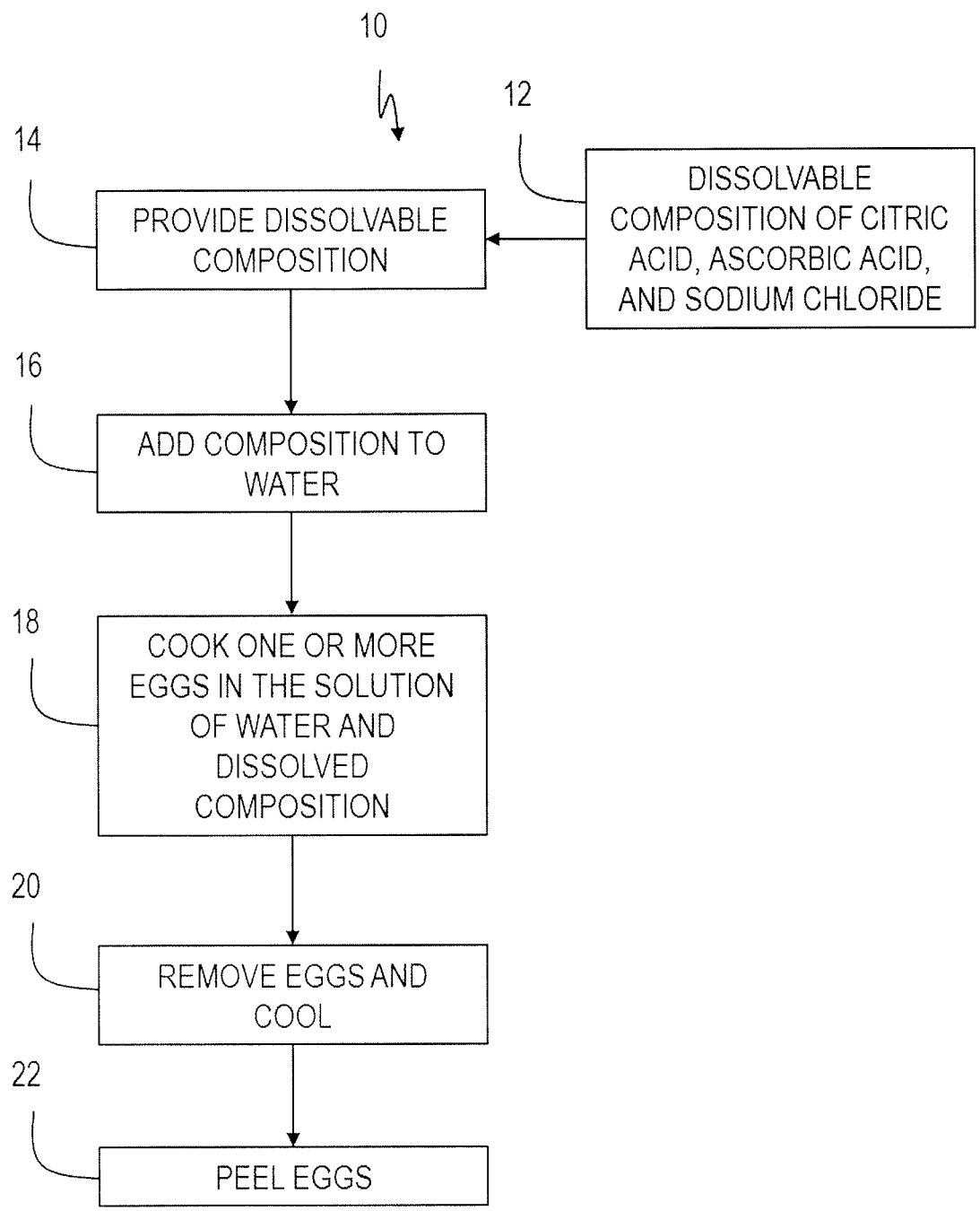

COMPOSITION AND METHOD FOR PEELING HARD BOILED EGGS

CROSS-REFERENCE TO RELATED APPLICATIONS

The present application claims priority to U.S. Provisional App. No. 62/686,449 filed on Jun. 18, 2018.

BACKGROUND OF THE INVENTION

1. Field of the Invention

The present invention to compositions for peeling hard boiled eggs and, more specifically, to a composition for improving the ease by which egg shells are removed after boiling.

2. Description of the Related Art

Peeling a hard-boiled egg for consumption is a laborious process and often involves the loss of edible egg whites due to adhesion between the shell and the egg whites. When peeling an egg, the nutritional egg white often becomes stuck to the shell and becomes inedible. As a result, the food is wasted along with time and money.

Conventional approaches to peeling eggs are gadgets that consume storage space, add additional steps to the process, can get lost or damaged, and are time consuming. For example, plastic gadgets require a number of additional steps and therefore add time to the peeling process while consuming valuable kitchen storage space. Commercial size egg peeling machines are not suitable or economical for a personal or low-volume commercial kitchen. Accordingly, there is a need in the art for an egg peeling approach that is quick, easy, and does not require sophistical or space wasting equipment.

BRIEF SUMMARY OF THE INVENTION

The present invention provides a quick and easy solution for peeling eggs by providing a composition that can be easily added to the boiling water used to cook eggs. The composition is an amount of citric acid, an amount of ascorbic acid, and an amount of sodium chloride are in a ratio of 1.2:0.1:0.05, respectively. The composition is added to the water used to boil the eggs. After boiling, the eggs may be cooled and the shell removed more easily than normal without the need for special equipment. Nothing could be easier than adding a pill to boiling water, which is already a step in the process of cooking hard boiled eggs, to make the peeling process quick and easy without the loss of egg white. The composition of the invention provides for easy shell removal from a hardboiled egg without the loss of egg white, thereby preserving the nutritional egg white while reducing the time and effort required by the peeling process. In a preferred embodiment of the present invention, a user need only add a tablet containing composition to the boiling water and is thus an extremely quick and easy way to reduce peeling time, effort, and cost.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a flowchart of a method for peeling eggs using a composition according to the present invention.

DETAILED DESCRIPTION OF THE INVENTION

Referring to the figures, wherein like numeral refer to like parts throughout, there is seen in FIG. 1 a method 10 of dissolving the shell of a cooked egg using a dissolvable composition 12 according to the present invention. The first step 14 of method 10 involves providing a dissolvable composition 12 according to the present invention. Composition 12 according to the present invention may comprise approximately 1.2 grams of citric acid, 0.1 grams of ascorbic acid, and 0.05 grams of sodium chloride. Composition 12 may comprise multiples of the amounts of those chemicals while maintaining the ratio of components. For example, composition 12 may include an amount of citric acid, an amount of ascorbic acid, and an amount of sodium chloride in a ratio of 1.2:0.1:0.05, respectively. Composition 12 may be provided in a powder dispensed with a measuring scoop or in solid format that is easily dissolved in water, such as a tablet, caplet, capsule, etc. using appropriate binders, such as by direct compression or granulation along with starch, sugars, national binders such as acacia, or semisynthetic binders such as methyl cellulose, ethyl cellulose, polyethylene glycol, that are recognized as safe for consumption in the event than any residues are transferred to the eggs processed using composition 12.

The second step 16 of method 10 involves the addition of composition 12 to the water in which one or more eggs are to be boiled. Water may be boiling at the time of addition of composition 12, or brought to a boil thereafter, so that composition 12 fully dissolves in the water and produces a pH level of 2.6 to 3.0 (one liter or about four cups). It should be recognized that the amount of composition 12 to be added, such as by using more than one tablet containing 1.2 grams of citric acid, 0.1 grams of ascorbic acid, and 0.05 grams of sodium chloride, should be varied according to the amount of water so that the resulting pH is 2.6 to 3.0.

The next step 18 of method 10 involves cooking one or more eggs in the solution formed from the water and composition 14. Generally, eggs must be left in boiling water for 8-12 minutes to achieve the appropriate texture of the egg whites and egg yolks. As is known, the amount of time may vary based on the elevation above sea level of the location of boiling.

The next step 20 of method 12 involves removal of the eggs from the solution formed from the water and composition 14 once cooking to appropriate texture is complete so that the eggs may be allowed to cool sufficiently for handling, which may include placing in cold water for rapid cooling. The solution of water and composition 12 should have a pH of 4.0 or more.

Finally, the last step 22 of method 10 involves peeling the eggs. The egg shells should be soft and easily removed from the cooked egg whites. Alternatively, the eggs may be stored unpeeled, such as in a refrigerator, and peeled at a later time.

EXAMPLE 1

A composition for the egg peeling supplement was prepared as follows: 1.2 grams of citric acid, 0.1 grams of ascorbic acid, and 0.05 grams of sodium chloride were placed in a given amount of boiling water [HOW MUCH] to create a pH level of 2.6 to 3.0. An appropriate number of eggs (between one and four) were added to the water and boiled for 8-12 minutes to produce a desirable egg white and egg yolk texture. Eggs were removed from the solution and are placed in cold water to cool before peeling.

EXAMPLE 2

A composition for the egg peeling supplement was prepared as follows. 1.2 grams of citric acid, 0.1 grams of ascorbic acid, and 0.05 grams of sodium chloride were placed in a given amount of boiling water [HOW MUCH] to create a pH of 2.6 to 3.0. More eggs (4-6) were added to the water and boiled for 8-12 minutes to produce a desirable egg white and egg yolk texture. Eggs were removed from the solution and placed in cold water to cool before peeling.

EXAMPLE 3

A composition different than the egg peeling supplement was prepared as follows: 0.05 grams of citric acid, 0.1 grams of ascorbic acid, and 1.2 grams of sodium chloride were placed in a given amount of boiling water [HOW MUCH] to create a pH of greater than 3.0. An appropriate amount of eggs (1-4) are added to the water and boiled for 8-12 minutes to produce a desirable egg white and egg yolk texture. Eggs were removed from the solution and are placed in cold water to cool before peeling.

Example 1 was assessed by ease and of amount of egg white stuck to the shell. Shells essentially fell off or peeled with extreme ease without any loss of egg white. Examples 2 and 3 resulted in some loss of egg white and required greater peeling effort than Example 1.

The composition of the invention thus provides for easy shell removal from a hardboiled egg without the loss of egg white. The present invention not only provides peeling which preserves the nutritional egg white, but provides fast peeling requiring reduced effort and time. The present invention is suitable for all egg types (white, brown, organic, farm raised, etc.).

What is claimed is:

1. A composition for dissolving a shell of an egg, comprising:
    an amount of citric acid;
    an amount of ascorbic acid; and
    an amount of sodium chloride;
    wherein the amount of citric acid, the amount of ascorbic acid, and the amount of sodium chloride are in a ratio of 1.2:0.1:0.05, respectively.

2. The composition of claim 1, wherein the amount of citric acid, the amount of ascorbic acid, and the amount of sodium chloride will produce a pH of 2.6 to 3.0 in a predetermined amount of water.

3. The composition of claim 2, wherein the predetermined amount of water is about one liter.

4. The composition of claim 1, wherein the amount of citric acid is 1.2 grams.

5. The composition of claim 1, wherein the amount of ascorbic acid is 0.1 grams of ascorbic acid.

6. The composition of claim 1, wherein the amount of sodium chloride is 0.05 grams.

7. A method of dissolving a shell of an egg, comprising the steps of:
    providing an amount of citric acid, an amount of ascorbic acid, and an amount of sodium chloride to water so that the resulting pH is 2.6 to 3.0 and wherein the amount of citric acid, the amount of ascorbic acid, and the amount of sodium chloride are in a ratio of 1.2:0.1:0.05, respectively; and
    boiling at least one egg in the water until the at least one egg is cooked a desired amount.

8. The method of claim 7, further comprising the step of cooling the at least one eff after the at least one egg is cooked.

9. The method of claim 8, further comprising the step of peeling a shell of the at least one egg.

10. The method of claim 9, wherein the amount of citric acid, the amount of ascorbic acid, and the amount of sodium chloride will produce a pH of 2.6 to 3.0 in a predetermined amount of water.

11. The method of claim 10, wherein the predetermined amount of water is about liter.

12. The method of claim 10, wherein the amount of citric acid is 1.2 grams.

13. The method of claim 10, wherein the amount of ascorbic acid is 0.1 grams of ascorbic acid.

14. The method of claim 10, wherein the amount of sodium chloride is 0.05 grams.

* * * * *